United States Patent
Wewers et al.

(10) Patent No.: US 10,771,361 B2
(45) Date of Patent: Sep. 8, 2020

(54) APPARATUS AND METHOD FOR PROVIDING POWER TO MACHINE MEASUREMENT DEVICES VIA DATA COMMUNICATION NETWORK

(71) Applicant: epro GmbH, Gronau (DE)

(72) Inventors: Thomas Wewers, Gronau (DE); Christian Pliete, Ochtrup (DE); Raphael Wittmund, Heek (DE); Sven Wermers, Gronau (DE)

(73) Assignee: epro GmbH (DE)

( * ) Notice: Subject to any disclaimer, the term of this patent is extended or adjusted under 35 U.S.C. 154(b) by 198 days.

(21) Appl. No.: 16/013,413

(22) Filed: Jun. 20, 2018

(65) Prior Publication Data

US 2018/0309649 A1    Oct. 25, 2018

Related U.S. Application Data

(63) Continuation-in-part of application No. 15/245,630, filed on Aug. 24, 2016, now abandoned.

(51) Int. Cl.
    *H04L 12/26*      (2006.01)
    *H04L 12/10*      (2006.01)
    *H04L 29/08*      (2006.01)
    *H04L 12/40*      (2006.01)

(52) U.S. Cl.
    CPC .............. *H04L 43/08* (2013.01); *H04L 12/10* (2013.01); *H04L 12/40045* (2013.01); *H04L 43/12* (2013.01); *H04L 67/125* (2013.01)

(58) Field of Classification Search
    CPC ...................................................... H04L 43/08
    See application file for complete search history.

(56) References Cited

U.S. PATENT DOCUMENTS

| | | | | |
|---|---|---|---|---|
| 2007/0101814 | A1* | 5/2007 | Campbell | G01H 11/08 73/514.34 |
| 2008/0294915 | A1* | 11/2008 | Juillerat | G06F 1/266 713/300 |
| 2013/0201316 | A1* | 8/2013 | Binder | H04L 67/12 348/77 |
| 2016/0173672 | A1* | 6/2016 | Boyce | H04M 19/001 379/437 |

* cited by examiner

*Primary Examiner* — Suraj M Joshi
(74) *Attorney, Agent, or Firm* — Luedeka Neely Group, P.C.

(57) ABSTRACT

A machine health management system incorporates machine measurement units that are connected via Power Over Ethernet (PoE) to a central logic unit. Each measurement unit includes one or more sensor modules to which sensors are connected, or one or more output modules to which output devices are connected, or a combination of sensor modules and output modules. The energy needed to power the measurement units comes through the PoE network. Sensor signals generated by the sensors are digitalized and may be analyzed in the sensor modules. Raw data, and in some cases preprocessed data, are transported over the Ethernet network to the central logic unit, where the data is analyzed and/or combined with other data to perform prediction analysis, build decisions and possibly implement protection solutions, predict performance of the machine/system, or control the machine/system.

10 Claims, 2 Drawing Sheets

APPARATUS AND METHOD FOR PROVIDING POWER TO MACHINE MEASUREMENT DEVICES VIA DATA COMMUNICATION NETWORK

RELATED APPLICATIONS

This application claims priority as a continuation-in-part of U.S. patent application Ser. No. 15/245,630, filed Aug. 24, 2016, titled "Apparatus and Method for Providing Power to Machine Measurement Devices via Data Communication Network."

FIELD

This invention relates to the field of data collection for machine health management and control. More particularly, this invention relates to a system for providing power to machine data collection devices through data communication networks.

BACKGROUND

Monitoring and control of complex industrial machines generally requires many sensors of various types (vibration, temperature, pressure, etc.) and control devices (i.e., for switches, valves and actuators) distributed at various locations on or near the machine. Typically, such sensors and control devices are connected to monitoring and control systems in an industrial plant via a communication network. Disadvantages associated with prior communication networks in such applications include:

- data transfer distance is limited;
- many power supplies are required to power widely distributed sensors and control devices, which contributes to higher costs;
- the length of signal lines between sensors and sensor modules tends to be long, contributing to noise problems on low-amplitude signals; and
- because the conversion from analog signals to digital signals occurs at the sensor module, long signal lines between sensors and sensor modules further increase the probability of noise.

What is needed, therefore, is a machine monitoring and control network that alleviates the problems associated with fieldbus networks.

SUMMARY

The above and other needs are met by a machine health management system that incorporates machine measurement units connected via Power Over Ethernet (PoE) to a central logic unit. Each measurement unit includes one or more sensor modules to which sensors are connected and/or one or more output modules to which output devices are connected. Examples of sensors include eddy current sensors, piezo electric sensors, seismic probe sensors, Linear Variable Differential Transformer (LVDT) sensors, and temperature sensors. Examples of output devices include relays, analog voltage, and analog current. The energy needed to power the measurement units comes through the PoE network.

Sensor signals generated by the sensors are digitalized and may be analyzed in the sensor modules. Raw data, and in some cases preprocessed data, are transported over the Ethernet network to the central logic unit. At the central logic unit, data is analyzed and/or combined with other data to perform prediction analysis, build decisions and possibly implement protection solutions, predict performance of the machine/system, or control the machine/system.

Examples of protection solutions include switching off a machine/system based on alarm values, generating warnings for upper systems, and voting between different values. Examples of prediction analysis include analyzing the raw data (PeakVue, FFT, comparisons to good, etc.) in the measurement module or in the central logic unit and reporting the health of the machine/system to plan maintenance service intervals. An example of a control solution is to combine different inputs and outputs to follow the control sequence and make decisions about whether to allow a system run in the programmed way.

Use of PoE in a control network may be separated from a standard office Ethernet so that deterministic protocols may be implemented. In various embodiments, both deterministic and standard Ethernet protocols may be used, depending on whether the application is for prediction or protection or other.

As described in more detail hereinafter, embodiments of the invention are directed to a machine measurement system for collecting vibration data that is indicative of operational conditions of machines in an industrial setting. In a preferred embodiment, the system includes a central logic unit, an Ethernet network switch, and a dual-channel measurement unit. The Ethernet network switch is in communication with the central logic unit via an Ethernet network. The Ethernet network switch includes an internal power supply and one or more Power over Ethernet (PoE) ports that communicate data and provide power to devices connected thereto. The dual-channel measurement unit includes first and second sensors and one or more sensor modules. The first sensor senses vibration of the machine and generates a first type of vibration data. The second sensor senses vibration of the machine and generates a second type of vibration data. Each sensor module includes one or more sensor interfaces for providing an electrical connection to one or both of the first and second sensors. Each sensor module also includes a PoE port connected to one of the PoE ports of the Ethernet network switch for communicating data to and receiving power from the Ethernet network switch.

In some embodiments, the first and second sensors are mounted in a single measurement unit housing.

In some embodiments, the Ethernet network switch is disposed within the measurement unit housing.

In some embodiments, the first sensor comprises an eddy current sensor, and the second sensor comprises a piezo electric sensor or a seismic probe sensor.

In some embodiments, the machine includes a rotating shaft supported by a bearing, and the dual-channel measurement unit is mounted on the machine adjacent the shaft and bearing. The first sensor of these embodiments comprises an eddy current sensor, and the first type of vibration data is indicative of relative shaft vibration. The second sensor of these embodiments comprises a piezo electric sensor or a seismic probe sensor, and the second type of vibration data is indicative of absolute bearing vibration. The central logic unit of these embodiments receives the first and second types of vibration data via the Ethernet network, and calculates absolute shaft vibration according to:

absolute shaft vibration=relative shaft vibration−absolute bearing vibration.

Some embodiments of the system include a central logic unit, a first Ethernet network switch, and one or more first sensor modules. The central logic unit, which is in communication with an Ethernet network, receives and processes the machine data, which may include machine prediction data, machine protection data, and machine control data. The first Ethernet network switch, which is in communication with the central logic unit via the Ethernet network, includes an internal power supply and one or more Power over Ethernet (PoE) ports that are operable to communicate data and provide power to connected devices. Each first sensor module includes a sensor interface for providing an electrical connection to a sensor, and a PoE port connected to one of the PoE ports of the first Ethernet network switch. The PoE port of each first sensor module communicates data to and receives power from the first Ethernet network switch.

In some embodiments, the first Ethernet network switch and the first sensor modules are disposed within a single measurement unit housing.

In some embodiments, the machine measurement system includes one or more first output modules. Each first output module includes an output interface for providing an electrical connection to an output device, and a PoE port connected to one of the PoE ports of the first Ethernet network switch. The PoE port of each first output module communicates data to and receives power from the first Ethernet network switch.

In some embodiments, the one or more first output modules are disposed within the measurement unit housing.

In some embodiments, the machine measurement system includes a second Ethernet network switch and one or more second sensor modules. The second Ethernet network switch, which has no internal power supply, includes a PoE port that is connected to one of the PoE ports of the first Ethernet switch for communicating data to and receiving power from the first Ethernet network switch. The second Ethernet network switch also includes one or more PoE ports that are operable to communicate data and provide power to devices connected to the second Ethernet network switch. Each of the second sensor modules includes a sensor interface for providing an electrical connection to a sensor, and a PoE port connected to one of the PoE ports of the second Ethernet network switch. The PoE port of each second sensor module communicates data to and receives power from the second Ethernet network switch.

In some embodiments, the second Ethernet network switch and the second sensor modules are disposed within the measurement unit housing.

In some embodiments, the sensor interface of each of the first sensor modules is operable to provide an electrical connection to an eddy current sensor, piezo electric sensor, seismic probe sensor, Linear Variable Differential Transformer (LVDT) sensor, voltage sensor, current sensor, temperature sensor or pressure sensor.

In some embodiments, the output interface of each of the first output modules is operable to provide an electrical connection to a relay, a switch, an actuator, a valve, a digital output, a voltage output, a current output, a linear position unit, and a step motor.

In some embodiments, the machine measurement system includes a third Ethernet network switch. The third Ethernet network switch includes an internal power supply, one or more PoE ports that communicate data and provide power to connected devices, a wireless module for wirelessly communicating data to and from the third Ethernet network switch, and one or more third sensor modules. Each of the third sensor modules include a sensor interface that provides an electrical connection to a sensor, and a PoE port connected to one of the PoE ports of the third Ethernet network switch. The PoE port of each third sensor module communicates data to and receives power from the third Ethernet network switch.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views.

DETAILED DESCRIPTION

Figure 1:
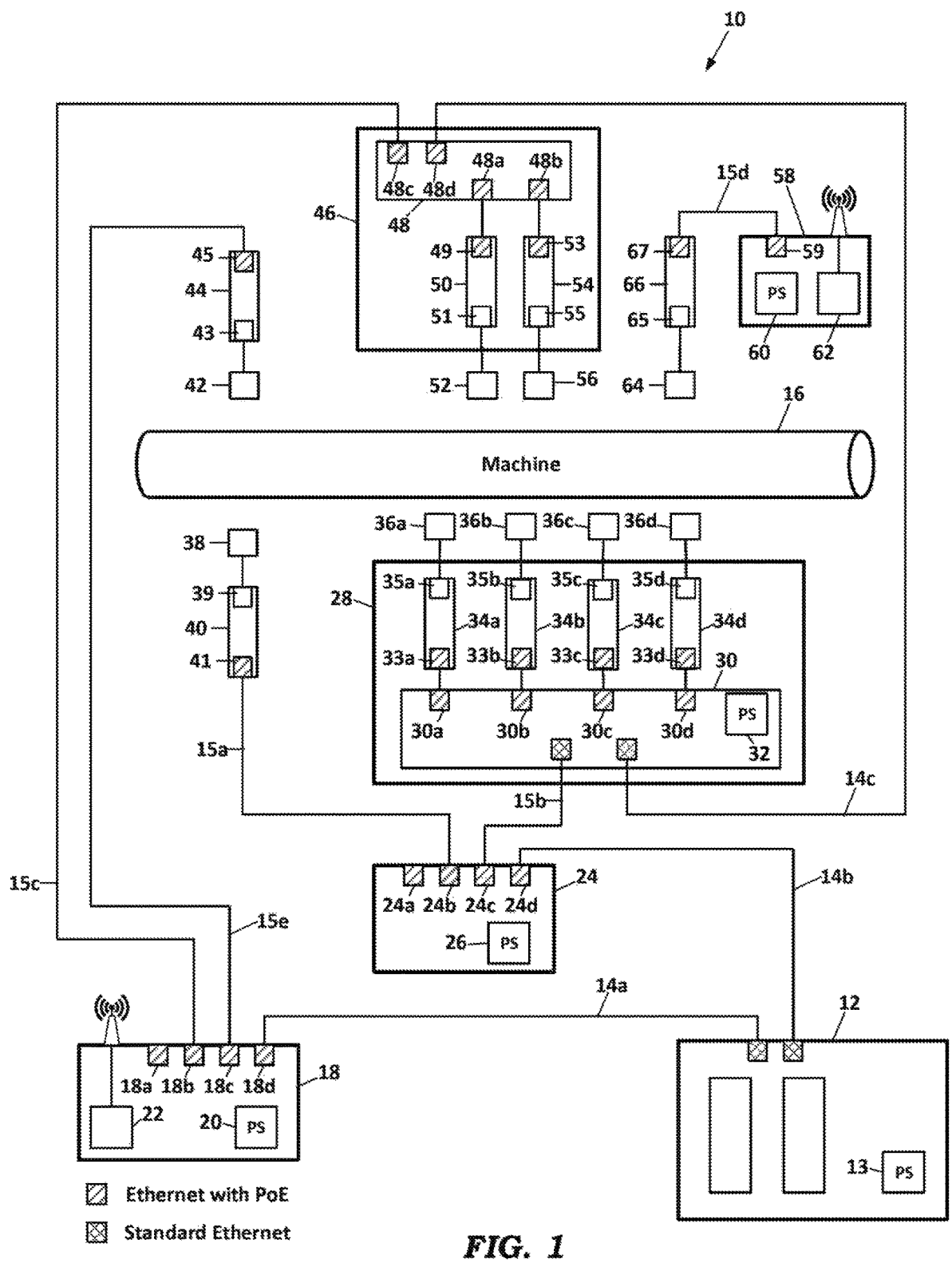
FIG. 1 depicts a system for powering and communicating with various components of a machine measurement/control system via Power Over Ethernet according to a preferred embodiment.

As shown in FIG. 1, a preferred embodiment of a machine measurement/control system 10 includes a central logic unit 12 that receives and processes data collected by various sensor modules or output modules associated with a machine 16 in an industrial plant. The central logic unit 12 is in communication with network switches 18 and 24 via a communication network, which in a preferred embodiment includes standard Ethernet cables 14a and 14b. In the preferred embodiment, the central logic unit 12 includes a power supply 13.

The network switches 18 and 24, which are powered by their own power supplies 20 and 26, provide Power Over Ethernet (PoE) to connected devices via a PoE Ethernet cable 15. The network switch 24 is preferably a wired Ethernet switch, whereas the switch 18 supports wireless network communications via a wireless module 22, in addition to wired communications. The switch 24 provides data communications and power to a vibration sensor module 40 via a PoE port 24b and the PoE cable 15a. The vibration sensor module 40 generates vibration data based on vibration signals received from a vibration sensor 38, such as a piezoelectric sensor. The vibration sensor module 40 includes a sensor interface 39 for connection to the sensor 38 and a PoE port 41 for connection to the PoE cable 15a. Disposed within the sensor module 40, between the sensor interface 39 and the PoE port 41, are signal conditioning circuitry and analog-to-digital conversion circuitry.

The switch 24 also provides data communications to a first measurement unit 28 via the PoE cable 15b. More specifically, the PoE cable 15b provides data communication to a network switch 30 which is a component of the first measurement unit 28. The switch 30, which has its own internal power supply 32, provides data communication and power via PoE ports 30a-30d to sensor modules and output modules 34a-34d that are components of the measurement/control unit 28. Each sensor and output module 34a-34d includes a PoE port 33a-33d. The sensor and output modules include a valve control actuator module 34a which is connected via a sensor interface 35a to a valve control actuator 36a, two vibration monitoring modules 34b and 34c which are connected via sensor interfaces 35b and 35c to vibration sensors 36b and 36c, and a voltage measurement module 34d that is connected via a sensor interface 35d to a voltage sensor 36d. The switch 30 and modules 34a-34d of the first measurement unit 28 are preferably housed in a single measurement unit housing.

The switch 18 provides data communications and power to a current measurement module 44 via the PoE connection 15e and the PoE port 45. The current measurement module 44 generates current data based on current measurement signals received via interface 43 from a current sensor 42.

The switch 18 also provides data communications and power to a second measurement unit 46 via the PoE port 18b and PoE cable 15c. More specifically, the PoE cable 15c provides data communication and power to a PoE port 48c of a network switch 48 that is a component of the second measurement unit 46. The switch 48, which does not have its own internal power supply, provides data communication and power via PoE ports 48a and 48b to PoE ports 49 and 53 of two sensor modules 50 and 54 that are components of the measurement/control unit 46. The sensor modules 50 and 54 comprise two vibration monitoring modules that generate vibration data based on vibration signals received via sensor interfaces 51 and 55 from vibration sensors 52 and 56. In one preferred embodiment discussed hereinafter, the sensor 52 is an eddy current sensor and the sensor 56 is a piezoelectric sensor or a seismic sensor. The switch 48 and vibration monitoring units 50 and 54 of the second measurement unit 46 are preferably housed in a measurement unit housing. The switch 48 may also be in communication with the switch 30 via a standard Ethernet connection 14c.

In this exemplary embodiment, the system 10 also includes a wireless switch 58 that has its own internal power supply 60. The switch 58 provides data communications and power to a PoE port 67 of a tachometer module 66 via a PoE port 59 and PoE cable 15d. The tachometer module 66 generates tachometer data based on tachometer pulses received via sensor interface 65 from a tachometer sensor 64.

There are several advantages of the machine measurement/control system 10 depicted in FIG. 1 over conventional systems, such as industrial networks that employ Fieldbus wiring. Those advantages include:
 data can be transferred over longer distances;
 widely distributed measurements can be made using fewer power supplies;
 the distance between sensors and sensor modules can be shorter, thereby lessening the probability of picking up noise on low amplitude signals;
 the conversion from analog signals to digital signals occurs closer to the sensors, further reducing probability of noise; and
 lower installation costs.

Another advantage is scalability. For example, in one embodiment, a grouping of two, three, four, five, six or more sensor or output modules can be grouped together in a single housing and connected as a unit to the communication network. Inside the housing is a PoE network switch that connects the machine measurement/control Ethernet network with the PoE network. The modules grouped in the housing need one or two Ethernet inputs (ring structure for availability) and a power input. Internally to the housing, the POE switch supplies power to the individual Sensor over Ethernet (SoE), Actor over Ethernet (AoE), Input over Ethernet (IoE), Vibration over Ethernet (VoE), or Functional Safety over Ethernet (FSoE) modules. In this context, an "actor" refers to an active component in a process or control unit, such as a valve or a relay. External network connections can be accomplished via wireless, optical Ethernet or other standard technology.

Dual-Channel Measurement Devices

According to a preferred embodiment, a dual-channel measurement device combines phase-synchronized data collection from two measurement channels in one electronic measurement unit. This allows the dual-channel device to implement the most accurate machine prediction and protection algorithms that require two measurement channels and real-time accuracy.

One example of a measurement that may be implemented using a phase-synchronized two-channel device is absolute shaft vibration. In this measurement, one sensor measures relative vibration between a sensor housing and the machine shaft, and another sensor measures the vibration of the sensor housing. The housing vibration is subtracted from the relative shaft-to-housing vibration to determine the real shaft vibration inside the housing. Thus, in this measurement mode, the two channels are combined to measure and calculate the absolute shaft vibration, such as in units of μm or "mil." In preferred embodiments, signal amplitudes are evaluated as zero-to-peak or peak-to-peak.

In a preferred embodiment, the absolute shaft vibration is the absolute bearing vibration subtracted from the relative shaft vibration according to:

absolute shaft vibration=relative shaft vibration−absolute bearing vibration.

Preferably, an eddy current sensor is used to measure the relative shaft vibration and a seismic or piezoelectric sensor is used to measure the absolute bearing vibration. In preferred embodiments, the eddy current sensor and the seismic or piezoelectric sensor are mounted in a single measurement unit housing, so that they are aligned along the same measurement axis at the same measurement location on the machine.

Figure 2:
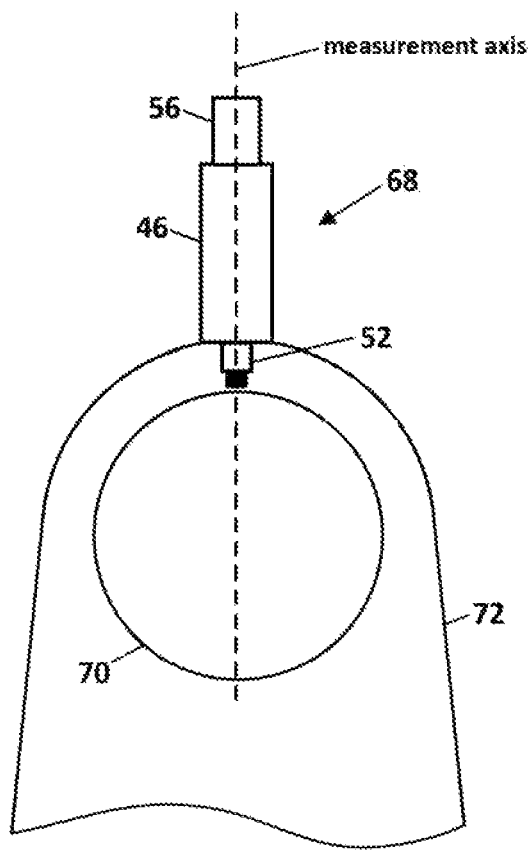
FIG. 2 depicts a two-channel measurement device according to a preferred embodiment.

Shown in FIG. 2 is one example of a dual-channel measurement device 68 for making an absolute shaft vibration measurement on a rotating shaft 70 supported by a bearing 72. In this preferred embodiment, the measurement device 68 includes an eddy current sensor 52 and a piezoelectric sensor 56 mounted in the same measurement unit housing 46. However, other types of sensors may be provided in other embodiments of multi-channel measurement devices.

As depicted in FIG. 1, power for the eddy current sensor 52 and the piezoelectric sensor 56 may be provided by the PoE connection to the network switch 18 via the network switch 48 contained in the measurement unit housing 46 of the device 48. Measurement data from the sensors 52 and 56 is also communicated via the network switch 48 and the network switch 88 to the central logic unit 12. The central logic unit 12 performs the calculations described above to determine the absolute shaft vibration. In a preferred embodiment, the measurement device 68 provides the relative shaft vibration data from the eddy current sensor 52 and the absolute bearing vibration from the sensor 56 at a rate of about 50 kHz. In other types of measurements, the data transfer rate may vary from about 20 kHz to about 200 kHz, depending on the type of measurement.

It will be appreciated that the absolute shaft vibration measurement is just one example of a measurement that may be made using a dual-channel measurement device. Other examples include:
 peak and phase measurements, which are made using two eddy current sensors;
 SMAX measurements, which are made using two eddy current sensors, or two piezo sensors, or two seismic sensors, or other combinations of two sensors;
 orbit measurements, which are made using two eddy current sensors;

rod drop measurements, which are made using two eddy current sensors, or an eddy current sensor and a piezo sensor, or an eddy current sensor and a seismic sensor; and rod gap measurements, which are made using two eddy current sensors, or an eddy current sensor and a piezo sensor, or an eddy current sensor and a seismic sensor.

Data Timestamping

In preferred embodiments, the various measurement modules 34a-34d, 40, 44, 50, 54, and 66 depicted in FIG. 1 apply a timestamp to the data from each associated sensor. For many types of measurements from single-channel measurement devices, timestamping accuracy can be sufficient for time-domain comparisons. For example, the timing accuracy of timestamped data from the various measurement modules 34a-34d, 40, 44, 50, 54, and 66 should be sufficient to allow the central logic unit 12 do a time-domain comparison of load data values from one networked module to vibration data values from another networked module to see a temporal connection between load and vibration.

To achieve a good timestamping accuracy, network protocols such as Network Time Protocol (NTP) or Precision Time Protocol (PTP) may be used for time synchronization between the various measurement modules and the central logic unit 12.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A machine measurement system for collecting vibration data that is indicative of operational conditions of a machine in an industrial setting, the machine including a rotating shaft supported by a bearing, the system comprising:
    a central logic unit that receives the vibration data that is indicative of the operational conditions of the machine, the central logic unit in communication with an Ethernet network;
    a Ethernet network switch in communication with the central logic unit via the Ethernet network, the Ethernet network switch comprising:
        an internal power supply for supplying power to the Ethernet network switch; and
        one or more Power over Ethernet (PoE) ports that are operable to communicate data and provide power to devices connected thereto; and
    a dual-channel measurement unit mounted adjacent the shaft and bearing of the machine, the dual-channel measurement unit comprising:
        a first sensor comprising an eddy current sensor for sensing vibration of the machine and generating a first type of vibration data that is indicative of relative shaft vibration;
        a second sensor comprising a piezo electric sensor or a seismic probe sensor for sensing vibration of the machine and generating a second type of vibration data that is indicative of absolute bearing vibration; and
    one or more sensor modules, each comprising:
        one or more sensor interfaces for providing an electrical connection to one or both of the first and second sensors; and
        a PoE port connected to one of the one or more PoE ports of the Ethernet network switch for communicating data to and receiving power from the Ethernet network switch,
    wherein the central logic unit receives the first and second types of vibration data via the Ethernet network, and calculates absolute shaft vibration according to:

$$\text{absolute shaft vibration} = \text{relative shaft vibration} - \text{absolute bearing vibration}.$$

2. The machine measurement system of claim 1 wherein the first and second sensors are mounted in a single measurement unit housing.

3. The machine measurement system of claim 2 wherein the one or more sensor modules are mounted in the single measurement unit housing.

4. The machine measurement system of claim 3 wherein the Ethernet network switch is disposed within the single measurement unit housing.

5. The machine measurement system of claim 1 wherein the central logic unit is operable to receive and process machine vibration data selected from the group consisting of machine prediction data, machine protection data, and machine control data.

6. The machine measurement system of claim 1 wherein the central logic unit is operable to receive machine vibration data and make the machine vibration data available for processing by an external data analysis system which returns processed machine vibration data to the central logic unit, wherein the processed machine vibration data is selected from the group consisting of machine prediction data, machine protection data, and machine control data.

7. A machine measurement system for collecting vibration data that is indicative of operational conditions of a machine in an industrial setting, the machine including a rotating shaft supported by a bearing, the system comprising:
    a central logic unit that receives the vibration data that is indicative of the operational conditions of the machine, the central logic unit in communication with an Ethernet network;
    a Ethernet network switch in communication with the central logic unit via the Ethernet network, the Ethernet network switch comprising:
        an internal power supply for supplying power to the Ethernet network switch; and
        one or more Power over Ethernet (PoE) ports that are operable to communicate data and provide power to devices connected thereto; and
    a dual-channel measurement unit mounted adjacent the shaft and bearing of the machine, the dual-channel measurement unit comprising:
        a first sensor comprising an eddy current sensor for sensing vibration of the machine and generating a first type of vibration data that is indicative of relative shaft vibration;
        a second sensor comprising a piezo electric sensor or a seismic probe sensor for sensing vibration of the machine and generating a second type of vibration data that is indicative of absolute bearing vibration; and one or more sensor modules, each comprising:
    one or more sensor interfaces for providing an electrical connection to one or both of the first and second sensors; and
    a PoE port connected to one of the one or more PoE ports of the Ethernet network switch for communicating data to and receiving power from the Ethernet network switch,
wherein the central logic unit receives the first and second types of vibration data via the Ethernet network, and calculates absolute shaft vibration based thereon.

8. The machine measurement system of claim 7 wherein the first and second sensors are mounted in a single measurement unit housing.

9. The machine measurement system of claim 8 wherein the one or more sensor modules are mounted in the single measurement unit housing.

10. The machine measurement system of claim 7 wherein the Ethernet network switch is disposed within the single measurement unit housing.

* * * * *